US009562990B2

(12) United States Patent
Itskovich et al.

(10) Patent No.: US 9,562,990 B2
(45) Date of Patent: Feb. 7, 2017

(54) FAST INVERSION OF MWD TRANSIENT EM DATA EXCITED BY A PULSE OF AN ARBITRARY SHAPE

(71) Applicants: Gregory B. Itskovich, Houston, TX (US); Marina N. Nikitenko, Novosibirsk (RU)

(72) Inventors: Gregory B. Itskovich, Houston, TX (US); Marina N. Nikitenko, Novosibirsk (RU)

(73) Assignee: BAKER HUGHES INCORPORATED, Houston, TX (US)

( * ) Notice: Subject to any disclaimer, the term of this patent is extended or adjusted under 35 U.S.C. 154(b) by 1112 days.

(21) Appl. No.: 13/849,828

(22) Filed: Mar. 25, 2013

(65) Prior Publication Data
US 2014/0288834 A1    Sep. 25, 2014

(51) Int. Cl.
G01V 3/38  (2006.01)
G01V 3/24  (2006.01)
G01V 3/06  (2006.01)

(52) U.S. Cl.
CPC . *G01V 3/38* (2013.01); *G01V 3/24* (2013.01); *G01V 3/06* (2013.01)

(58) Field of Classification Search
CPC ............ G01V 3/20; G01V 1/40; G01V 11/00; G01V 3/38; G01R 33/44; H04B 3/23
USPC ........ 367/7, 406.11; 324/309; 702/16, 6, 11; 703/6
See application file for complete search history.

(56) References Cited

U.S. PATENT DOCUMENTS

| 3,903,377 | A  | * | 9/1975  | Sato ........................ H04B 3/23 379/406.11 |
| 5,862,513 | A  |   | 1/1999  | Mezzatesta et al. |
| 5,889,729 | A  | * | 3/1999  | Frenkel .................... G01V 3/20 367/73 |
| 2009/0192711 | A1 |   | 7/2009  | Tang |
| 2010/0262373 | A1 | * | 10/2010 | Khadhraoui ............. G01V 1/40 702/16 |
| 2011/0166842 | A1 | * | 7/2011  | Banning-Geertsma G01V 11/00 703/6 |
| 2012/0215448 | A1 |   | 8/2012  | Hu et al. |
| 2012/0286779 | A1 | * | 11/2012 | Walsh .................... G01R 33/44 324/309 |

FOREIGN PATENT DOCUMENTS

GB    2159986 A    12/1985

OTHER PUBLICATIONS

International Search Report and Written Opinion for PCT Application No. PCT/US2014/031692, dated Aug. 19, 2014, pp. 1-11.
Mallick et al., "Monitoring of Hydrocarbon and Carbon-sequestrated Formations Using Time-lapse Seismic and Electromagnetic Data", University of Wyoming, pp. 1-3, downloaded Mar. 25, 2013, from http://faculty.gg.uwyo.edu/dueker/CREST%20dec%20pictures/SERGAProposalSubKenVladimir.pdf.

* cited by examiner

*Primary Examiner* — Andrew Schechter
*Assistant Examiner* — Kaleria Knox
(74) *Attorney, Agent, or Firm* — Cantor Colburn LLP

(57) ABSTRACT

A system and method of estimating properties of a subsurface formation are described. The method includes transmitting an excitation current pulse into the formation, receiving an induced pulse used to generate input data, and performing an inversion on the input data using a lookup table based on a shape of the excitation current pulse to estimate the properties of the subsurface formation.

5 Claims, 9 Drawing Sheets

FAST INVERSION OF MWD TRANSIENT EM DATA EXCITED BY A PULSE OF AN ARBITRARY SHAPE

BACKGROUND

In downhole exploration and production efforts, a number of sensors and measurement systems are used to provide information about the downhole environment. For example, temperature and pressure in the subsurface environment are typically monitored, and changes in these parameters may indicate the ingress of wellbore fluid or other useful information. Obtaining resistivity (or, inversely, conductivity) information about downhole formations may help to characterize the formation and facilitate decisions regarding drilling and production. Resistivity may be estimated from reflected or induced pulses resulting from transmitting electric pulses into the formation.

SUMMARY

According to one aspect of the invention, a method of estimating properties of a subsurface formation includes transmitting an excitation current pulse into the formation; receiving an induced pulse used to generate input data; and performing an inversion on the input data using a lookup table based on a shape of the excitation current pulse to estimate the properties of the subsurface formation.

According to another aspect of the invention, a method of performing inversion to estimate properties of a subsurface formation includes generating a first lookup table based on a step-function excitation pulse shape; and calculating a residual norm based on inversion of input data using the first lookup table to estimate the properties according to values that provide a minimum residual norm.

According to yet another aspect of the invention, a system to perform inversions to estimate properties of a subsurface formation includes a memory device configured to store a first lookup table; and a processor configured to calculate a residual norm based on inversion of input data using the first lookup table to estimate the properties according to values that provide a minimum residual norm.

BRIEF DESCRIPTION OF THE DRAWINGS

Referring now to the drawings wherein like elements are numbered alike in the several Figures.

DETAILED DESCRIPTION

As noted above, resistivity information about a formation may be helpful in ascertaining characteristics of the formation and making decisions based on the formation. Resistivity values may be estimated, rather than measured directly, based on induced (reflected) electrical pulses resulting from transmitting current pulses (excitation pulses) into the formation. Prior inversion algorithms used to estimate formation parameters from data acquired in this manner only account for step-function excitation pulses. In addition, the methods may rely on heuristic relationships between parameters that are not always valid under every circumstance. Embodiments of the system and method discussed herein relate to an inversion algorithm that employs look-up tables to provide inversion results.

Generally, inversion is a process of finding a model that provides the best fit between measured data and synthetic data. With respect to geophysical data, inversion facilitates inferring information about a formation from acquired data. The inference is usually statistical and generally not uniquely solvable. That is, when a single model fits the data, then an infinite number of models would fit the data, as well. Many of those models may, in fact, be unreasonable or yield inferences that are inaccurate. Embodiments of the system and method discussed herein include the use of prior information to reject the unreasonable models that fit the data.

Figure 1:
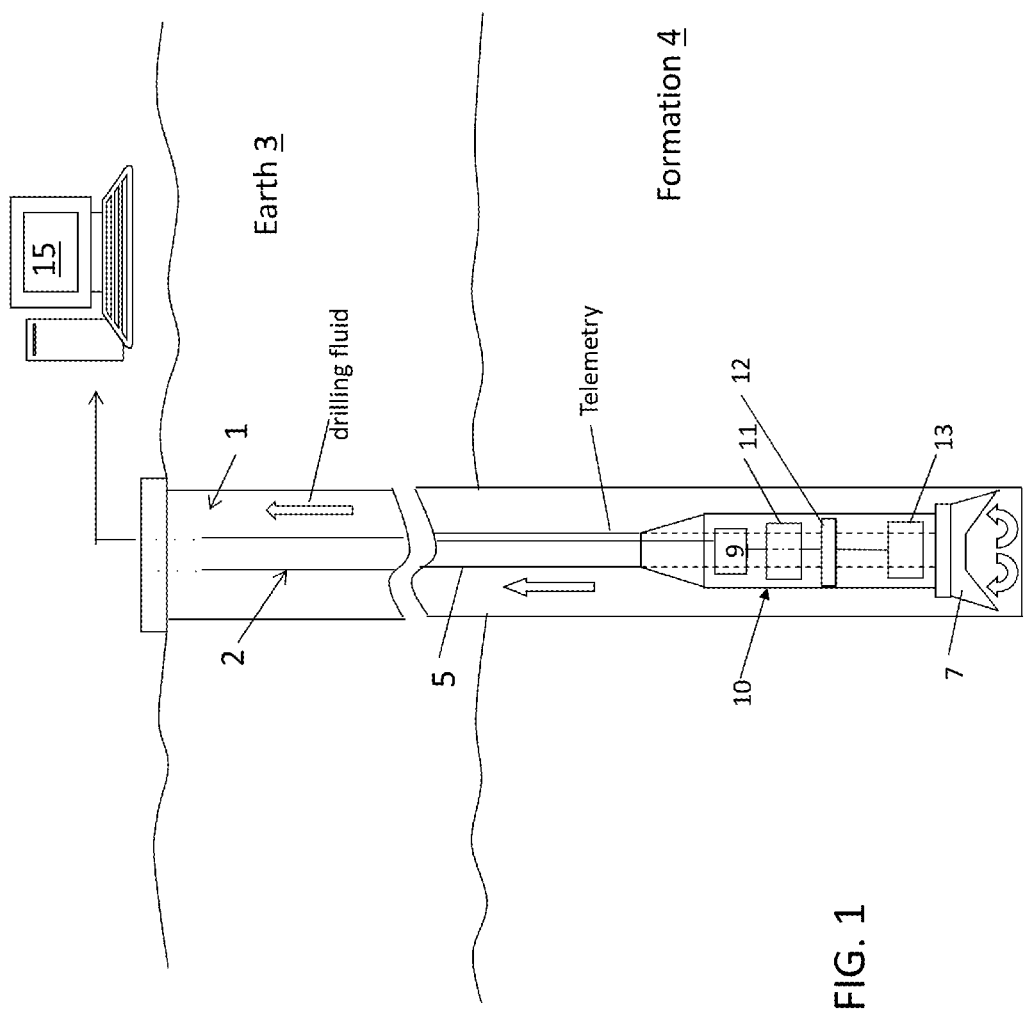
FIG. 1 is a cross-sectional view of an exemplary system to estimate the electrical properties of a formation.

FIG. 1 is a cross-sectional view of an exemplary system to estimate the electrical properties of a formation. While the system may operate in any subsurface environment, FIG. 1 shows a downhole tool 10 disposed in a borehole 2 penetrating the earth 3, which includes an earth formation 4. The downhole tool 10 may include a number of measurement devices to perform one or more types of measurements and is conveyed through the borehole 2 by a carrier 5. In the embodiment of FIG. 1, the carrier 5 is a drill string 6 in an embodiment known as Measure While Drilling (MWD). Disposed at a distal end of the drill string 6 is a drill bit 7. A drilling rig (not shown) may be disposed at the surface to conduct drilling operations and to pump drilling fluid through the drill string 6 and thus the drill bit 7 in order to lubricate the drill bit 7 and flush cuttings from the borehole 2. In alternate embodiments, the carrier 5 is an armored wireline used in wireline logging after drilling has ceased. Downhole electronics 9 may be configured to operate and/or process the information obtained by one of more of the measurement devices of the downhole tool 10 and interface with telemetry (e.g., mud pulse telemetry) to communicate data to the computer processing system 15 at the surface. The computer processing system 15 includes one or more processors, one or more memory devices, and input and output devices. The downhole electronics may include at least some of the components of the computer processing system 15 to process data downhole. The downhole tool 10 may include, for example, a density tool 12 and a spectroscopy tool 13. The downhole tool 10 also includes an induction tool 11 to transmit current pulses into the formation 4 and receive resultant induced pulses. The induction tool 11 may be comprised of separate housings for the transmitter and receiver portions. The inversion of the received induced pulses to determine formation resistivity and other parameters is discussed below.

Figure 2:
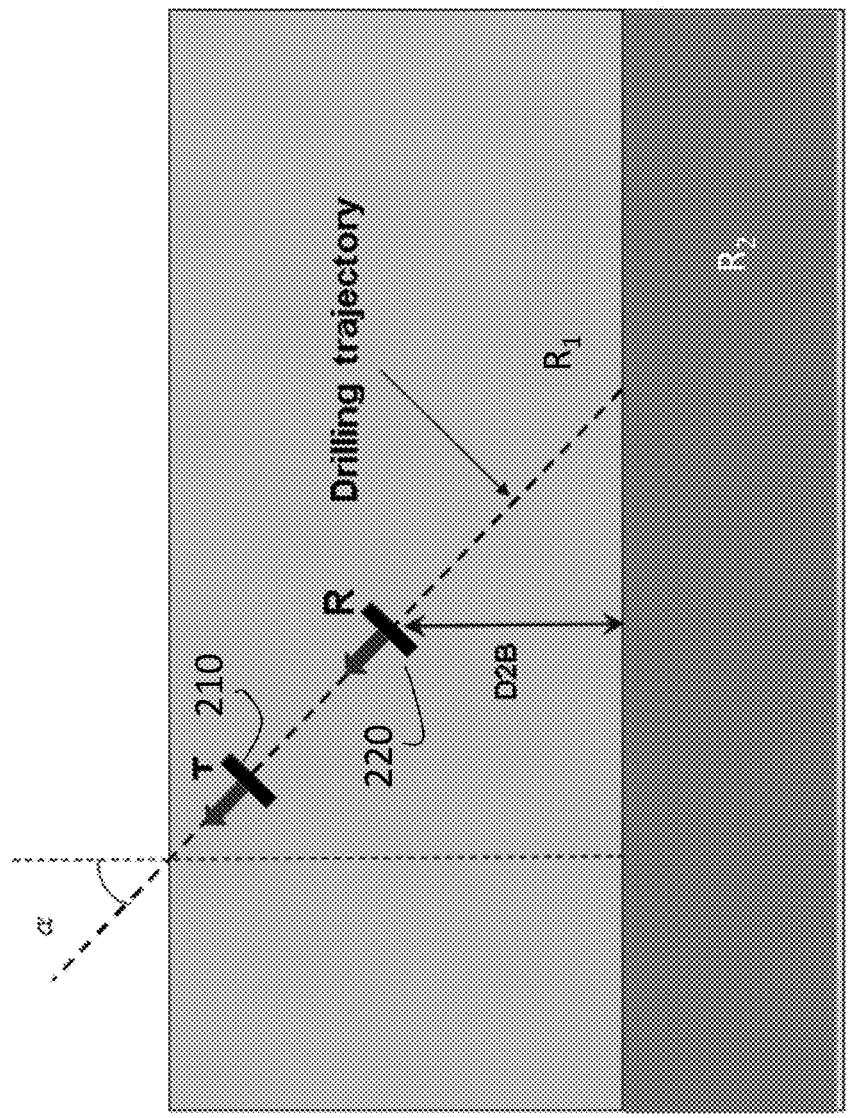
FIG. 2 illustrates an exemplary drilling trajectory for which the induction tool 11 is processed according to an embodiment of the invention.

FIG. 2 illustrates an exemplary drilling trajectory for which the induction tool 11 is processed according to an embodiment of the invention. Initially, models are defined that satisfy two primary applications: inferring characteristics ahead of the drill bit 7 and geo-steering. In the case of looking ahead of the drill bit 7, resistivity around the tool 10 (R1) and resistivity (R2) and distance (D2B) of the formation 4 ahead of the drill bit 7 are of interest. As shown in FIG. 2, the angle, α, is the inclination of the drilling trajectory with respect to the approaching layer. In order to parameterize the system, each parameter must have a defined range. In the exemplary case associated with FIG. 2, $R_1$ and $R_2$ resistivity values range between 0.5 and 200 ohms, and the inclination ($\alpha$) ranges from 0 to 90 degrees. To parameterize the distance (D2B), which is tool-specific, prior knowledge about the tool 10 depth of investigation is required. An exemplary maximum depth of investigation of 50 meters and a 1 meter minimal value are assumed for illustrative purposes. In the exemplary case, 20 nodes are used to discretize each parameter in the specified intervals (20 values within the specified range for each parameter). The transmitter 210 and the receiver 220 of the induction tool 11 (FIG. 1) are separated by 5 meters.

Figure 3:
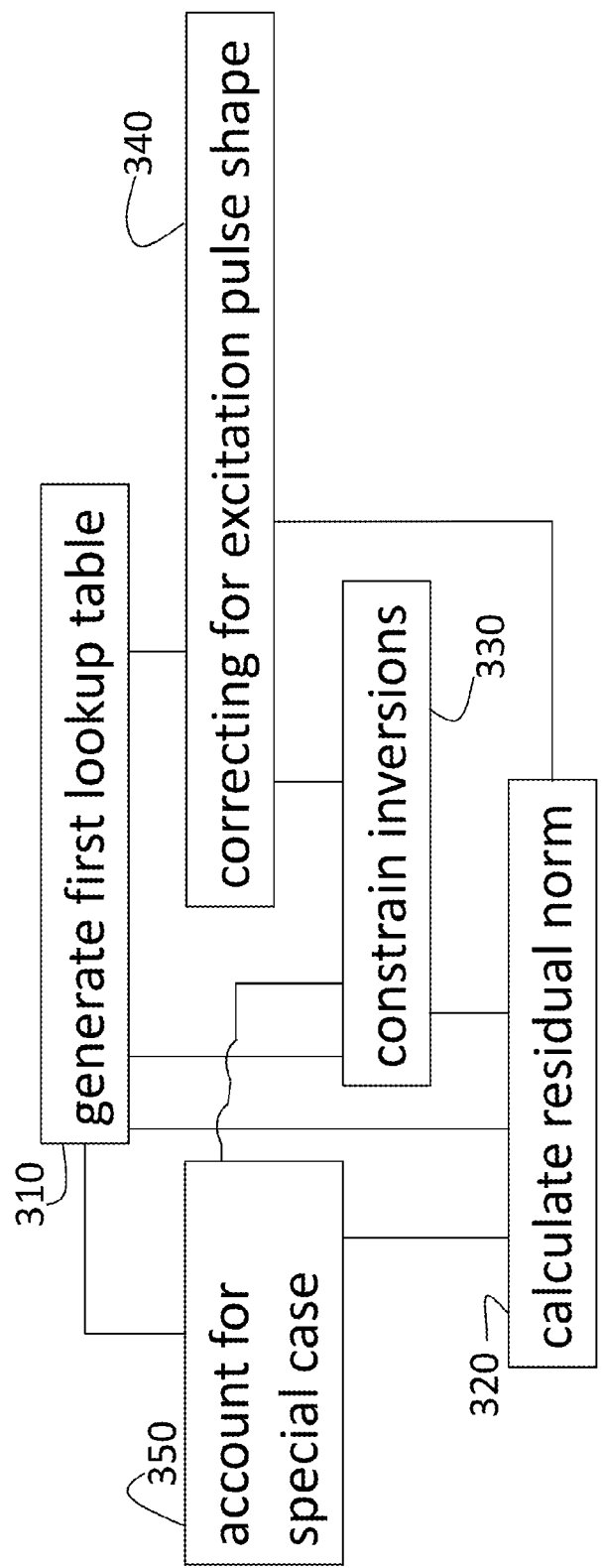
FIG. 3 is a process flow of a method of performing inversion to estimate electrical characteristics from an induced pulse according to embodiments of the invention.

FIG. 3 is a process flow of a method of performing inversion to estimate characteristics of a formation from an induced pulse according to embodiments of the invention. The method is described with reference to the exemplary parameters discussed above with reference to FIG. 2. The method of performing inversion involves performing best fit using at least one lookup table as detailed below. The lookup table may be stored by the one or more memory devices of the computer processing system 15 while the one or more processors of the computer processing system 15 perform the best fit. The discussion with reference to FIGS. 3-8 refers to one lookup table, but it should be understood that one look up table is generated for the parameters of interest corresponding to each axial component of interest. At block 310, generating the first lookup table (referred to here as the original lookup table) may be the most time-consuming operation. In order to generate the original lookup table of synthetic responses corresponding with the discretized above-described characteristics, 160,000 (or 20^4, due to the 4 parameters) forward modeling runs are needed. Assuming a step-function excitation current pulse and a duration of 1 second for each run, generation of the original lookup table (corresponding to a step-function excitation) would require 44 hours (160000/60/60/24) using a 2 giga Hertz (GHz) processor. For a depth of investigation below 50 meters (the assumed maximum for the example), a geometric time step in the time interval from 1 microsecond ($\mu$s) to 10 milliseconds (ms) (100 points) may be advisable. The original lookup table need only be generated once for a given transmitter 210 and receiver 220 spacing and orientation.

The method includes calculating residual norm at block 320. When measured data (e.g., induced pulse) is obtained, the obtained data and original lookup table data are compared to determine a best fit. Specifically, a residual norm $\lambda$ in each node (of the 20 exemplary nodes) of each of the exemplary four-dimensional parameters ($R_1$, $R_2$, $\alpha$, and D2B) is calculated and the parameters corresponding to the node for which $\lambda$ reaches a minimum value (best fit) are selected. The residual norm is calculated as:

$$\lambda = \frac{1}{NT} \sum_{j=1}^{NT} \left( \frac{S_E^j - S_O^j}{S_E^j} \right)^2 \quad [EQ\ 1]$$

where $S_E^j$ is the real data, $S_O^j$ is the synthetic data, and NT is the number of time readings in the measurements.

Figure 4:
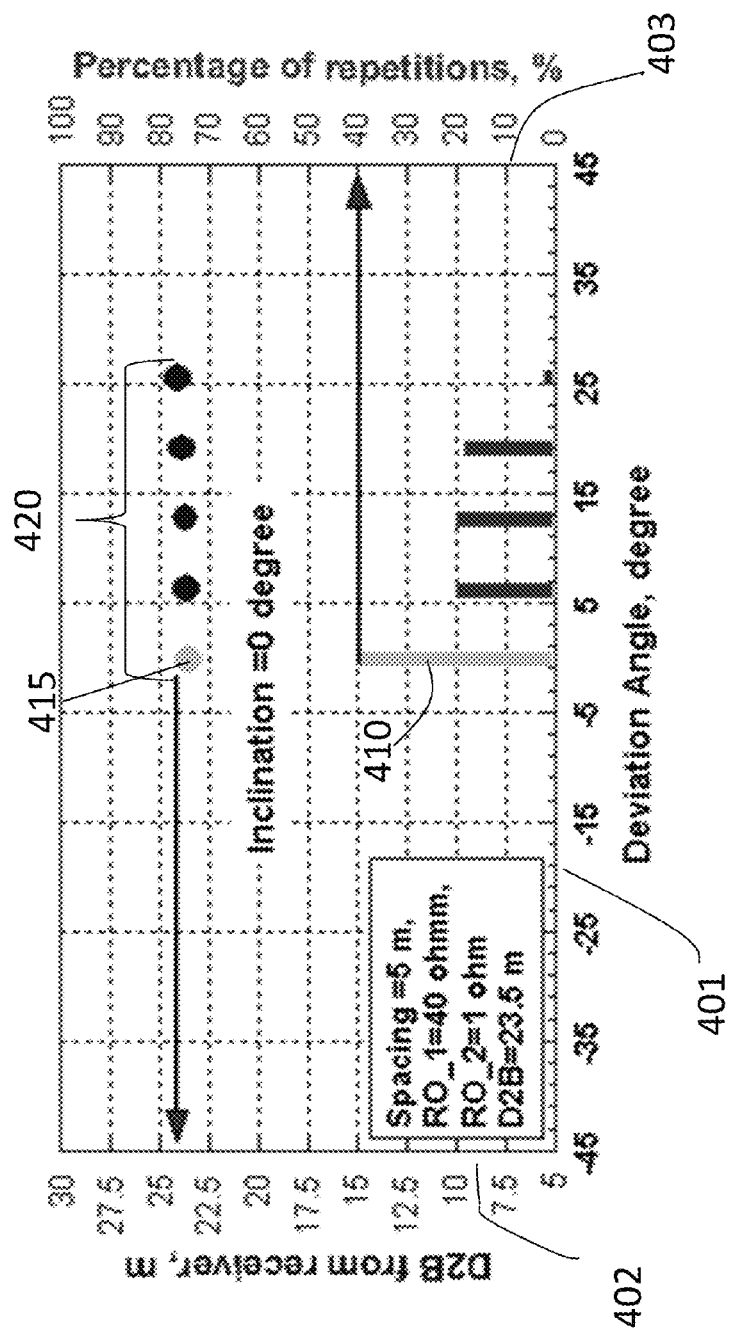
FIGS. 4-6 show results of a statistical inversion according to embodiments of the invention.
Figure 5:
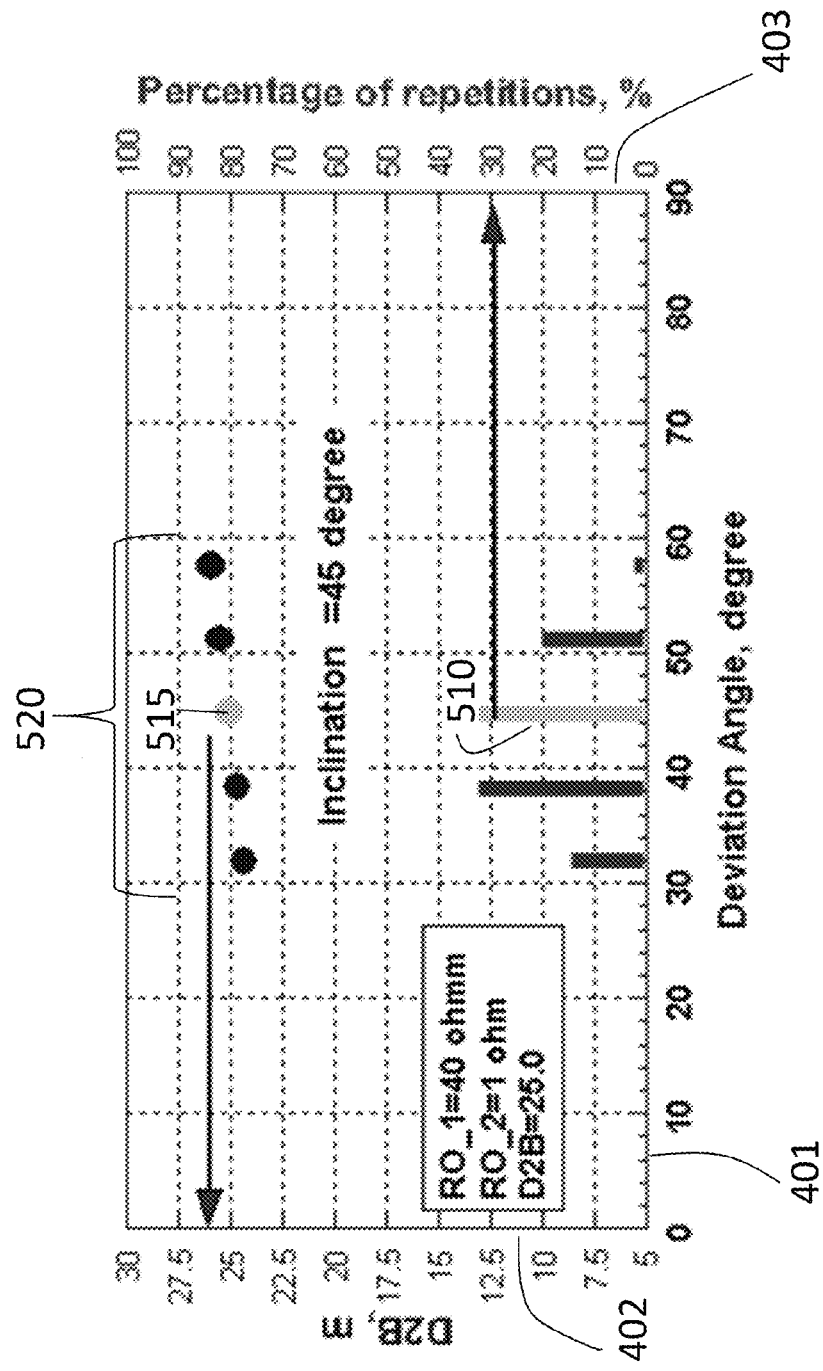
Figure 6:
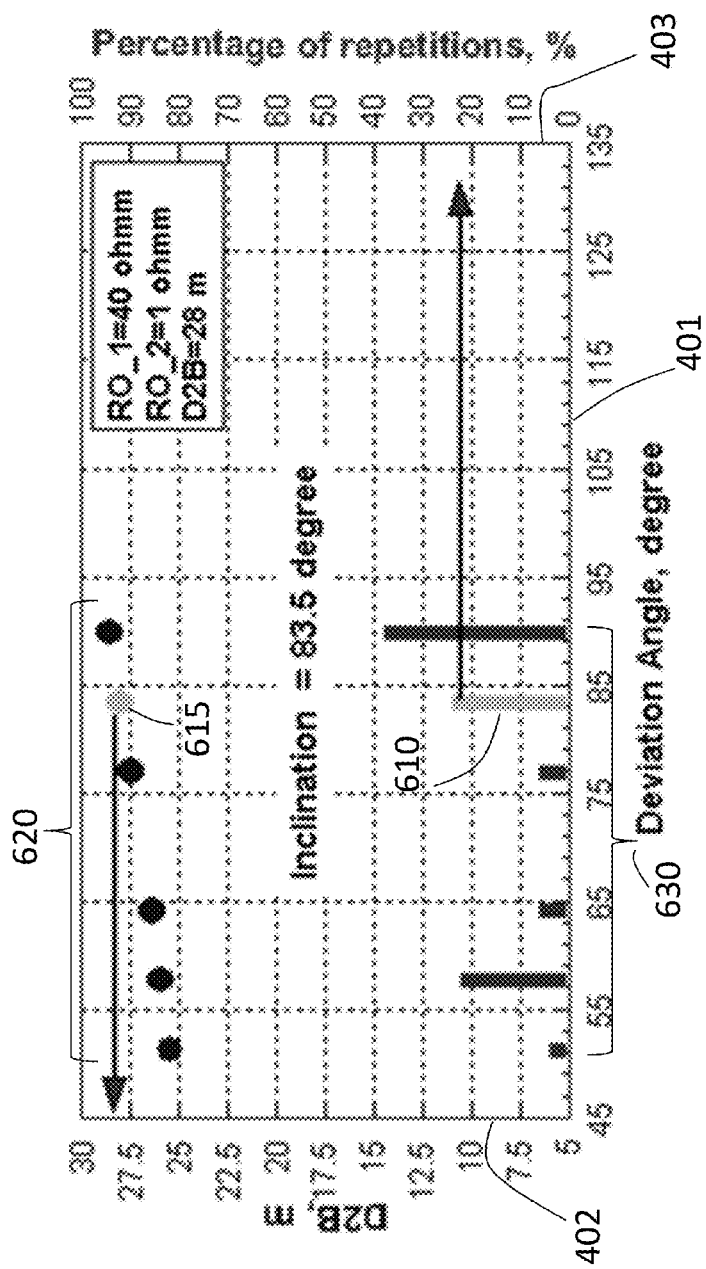

FIGS. 4-6 show results of a statistical inversion according to embodiments of the invention. Each of the three illustrated inversion examples involves 100 runs and a step-function excitation current pulse. That is, the exemplary figures indicate the D2B and inclination angle, $\alpha$, that provide the minimum residual norm ($\lambda$) for each run. Each run is contaminated with a different corresponding noise realization but the same standard deviation. This statistical inversion facilitates an evaluation of both accuracy and robustness of the inversion algorithm. Although ideally the different inversions runs would yield the same results, this is not the case in reality because of a limited number of measurements, the presence of noise, and the discrete nature of the synthetic data used in the inversion. The examples involve the arrangement shown in FIG. 2 with a distance of 5 meters between the transmitter 210 and the receiver 220. That is, simulated input data (measurements of transient electromagnetic data obtained by transmitting an excitation current pulse) for the inversion is generated using the model shown in FIG. 2.

In a first example, the distance to the boundary from the receiver (D2B) is 23.5 meters, $R_1$ is 40 ohm, $R_2$ is 1 ohm, and the angle of inclination, $\alpha$, is 0 degrees. The noise is 20%. FIG. 4 shows the angle of inclination, $\alpha$, resulting from the inversion on the x-axis (401). The left y-axis (402) shows the distance to the boundary from the receiver (D2B), and the right y-axis (403) shows the percentage of the 100 inversions runs that provided the same result. That is, each bar (e.g., 410) indicates the deviation angle (at the x-axis 401) and the percentage of the inversions that resulted in that same deviation angle (at the y-axis 403). The exact angle of inclination, $\alpha$, of 0 degrees was determined in approximately 40% of the runs (as indicated by 410). The exact distance (D2B) of 23.5 meters was determined by 40% of the runs, as well, but all the D2B values obtained through the 100 inversion runs (indicated by 420) are within an error of 5%. The inversion results for the other two parameters of the exemplary four parameters ($R_1$ and $R_2$) are not presented in the examples discussed herein.

In the next example, the distance to the boundary from the receiver (D2B) is 25 meters, $R_1$ is 40 ohm, $R_2$ is 1 ohm, and the angle of inclination, $\alpha$, is 0 degrees. The noise is 20%. FIG. 5 indicates that the exact angle of inclination, $\alpha$, of 9 degrees was determined in approximately 30% of the runs (as indicated by 510). The exact distance (D2B) of 25 meters (indicated by 515), was determined by less than a 5% error by all the runs (indicated by 520). In the third example, the inclination angle, $\alpha$, was changed to 83 degrees. FIG. 6 indicates that, the exact angle of inclination, $\alpha$, was found by just over 20% of the runs (as indicated by 610). Also, with the increased inclination angle, $\alpha$, the spread in the angle of inclination $\alpha$ found by the 100 inversion runs (as indicated by 630) is almost 40%. The spread in the D2B values (as indicated by 620) is also increased and the error in determining the correct D2B (indicated by 615) is 10%. These results discussed above, which are obtained by using the entire look up table, are contrasted below with constrained inversion, which reduces the uncertainties and uses only a subset of the lookup table for the inversion.

Figure 7:
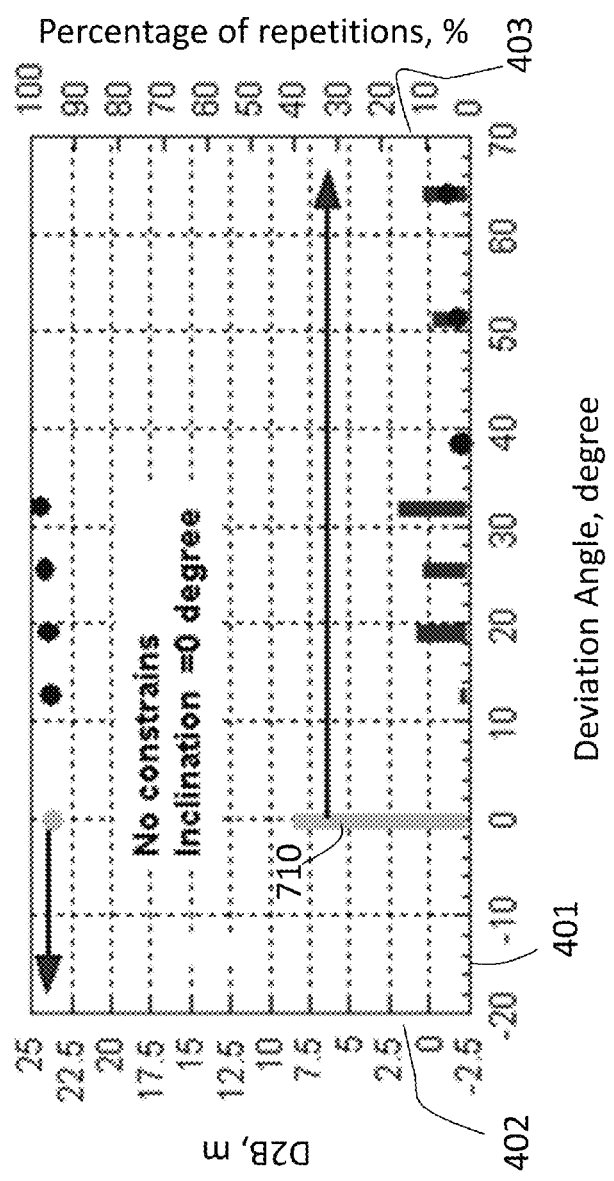
FIGS. 7 and 8 show results of a statistical inversion and constrained inversion, respectively, according to embodiments of the invention.
Figure 8:
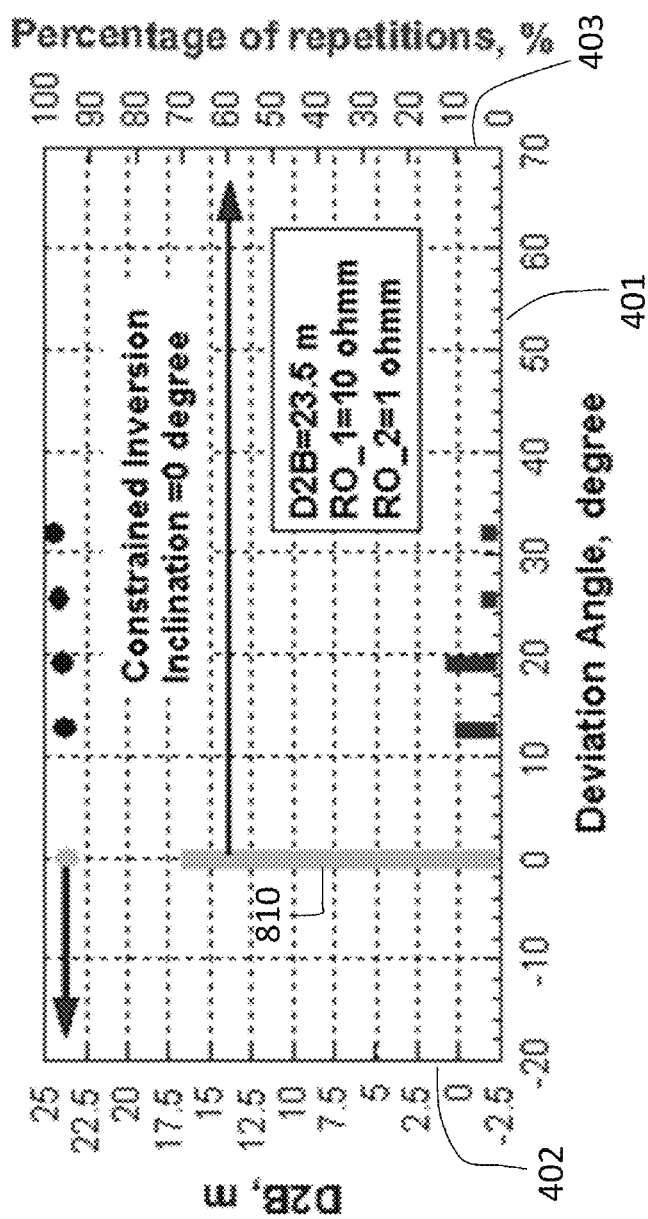

FIGS. 7 and 8 show results of a statistical inversion and constrained inversion, respectively, according to embodiments of the invention. The arrangement shown in FIG. 2 is used again with a reduced contrast in the resistivities of the two layers such that R1=10 ohm and R2=1 ohm. A distance D2B of 23.5 meters and 20% noise are used to generate the input data to test the inversion. FIG. 7, which shows the inversion results (100 runs) with no superimposition of constrains on the parameters. As indicated by FIG. 7, approximately 40% of the 100 runs resulted in determining the exact inclination angle, $\alpha$, of 0 degrees as indicated by 710. As shown at block 330 of FIG. 3, the method of performing inversion may include constraining the inversions. This is illustrated at FIG. 8. FIG. 8 shows that constraining the inversions leads to an increase in the number of inversions that result in the exact angle of inclination, α, to approximately 70% (as indicated by 810). The distance D2B values are within a 5% error. In the exemplary case shown in FIG. 8, the specific constrain involves excluding all models that correspond with a boundary that is not located below the receiver from the search for the minimal residual norm (λ). Constrains (elimination of portions of the lookup table based on prior knowledge) help to avoid erroneous inversion results and reduce uncertainties in the inverted parameters.

The discussion above involves a step-function current excitation pulse. However, in practical cases, the current pulse shape used to induce current pulses in the formation 4 may differ from that of a step function. This deviation in the excitation pulse shape may be caused by a receiver amplifier or by noise suppression filters, for example. In some cases, a more sophisticated excitation pulse shape is desirable because it better-characterizes the formation 4. Regardless of the reason for the excitation pulse shape, taking into account the excitation pulse shape while performing inversion yields improved results.

As shown at block 340 of FIG. 3, the method of performing inversion may include correcting for the excitation pulse shape. The lookup table generated as discussed above with reference to block 310 (the original lookup table) may be modified at block 340. The transient signals $S_0(t)$ (from the original lookup table) are used to calculate the $S_1(t)$ signals corresponding to $I(t)$ pulse excitation. This is done via a convolution integral:

$$S_1(t) = \int_0^t S_0(t-\tau) I'(\tau) d\tau \qquad [EQ.\ 2]$$

Modifying the previously generated original lookup table rather than regenerating another lookup table based on the excitation pulse shape eliminates a repetition of the time consuming process discussed above with regard to the generation of the original lookup table. The calculation of the integrals (EQ. 2) may require less than 10% of the time needed to generate the synthetic data for the step-function excitation (the original lookup table).

FIG. 3 shows that the method of performing inversion may include accounting for a special case at block 350. When the excitation current pulse is not a step function but is, instead, a linear pulse shape, this represents a special case. While the inversion for a linear pulse shape represents a special case, the use of a linear pulse shape in the investigation of a formation 4 may be typical. A modification of the original lookup table using EQ. 2 is not needed when a linear pulse shape has been used for the excitation current pulse. Instead, a time shift of the $S_0(t)$ signals may be sufficient. For example, for the following linear excitation pulse shape:

$$I(t) = \begin{cases} (t/t_0) & \text{if } 0 \leq t \leq t_0 \\ 1 & \text{if } t > t_0 \end{cases} \qquad [EQ.\ 3]$$

the signal $S_0(t)$ may be approximated by the following polynomial function:

$$S_0(t) = \frac{A}{t^n}, (2 \leq n \leq 4) \qquad [EQ.\ 4]$$

From EQ. 2, EQ. 3, and EQ. 4, $S_1(t)$ may be determined as:

$$S_1(t) = \frac{A}{t^n} \frac{1}{(n-1)\alpha} \left[ \frac{1}{(1-\alpha)^{n-1}} - 1 \right] \text{ if } t \geq t_0, \text{ where } \alpha = t_0/t \qquad [EQ.\ 5]$$

When α is small, EQ. 5 may be decomposed into the following series:

$$S_1(t) = \frac{A}{t^n}\left[1 + \frac{n\alpha}{2} + \frac{n(n+1)\alpha^2}{6} + \ldots \right] \qquad [EQ.\ 6]$$

which may be re-written:

$$S_1(t) = S_0(t) - \frac{t_0}{2} S_0'(t) + \frac{2}{3}\left[\frac{t_0}{2}\right]^2 S_0^n(t) - \ldots \qquad [EQ.\ 7]$$

For the time-shifted signal ($S_0(t-\tau)$), the following Taylor series applies:

$$S_0(t-\tau) = S_0(t) - \tau S_0'(t) + \frac{\tau^2}{2} S_0^n(t) - \ldots \qquad [EQ.\ 8]$$

By comparing EQ. 7 and EQ. 8, it becomes evident that, in a first order approximation, the signal $S_1(t)$, corresponding to the linear pulse shape, may be presented as $S_0(t)$ with a time shift Δt of $t_0/2$. A relative error ε due to this approximation is given by:

$$\varepsilon = \frac{S_1(t) - S_0(t)}{S_0(t)} = -\Delta t \frac{S_0'(t)}{S_0(t)} \approx \Delta t \frac{n}{t} \qquad [EQ.\ 9]$$

As indicated by EQ. 9, the error ε decreases as time (t) increases and, therefore, becomes negligible at a relatively late stage.

Figure 9:
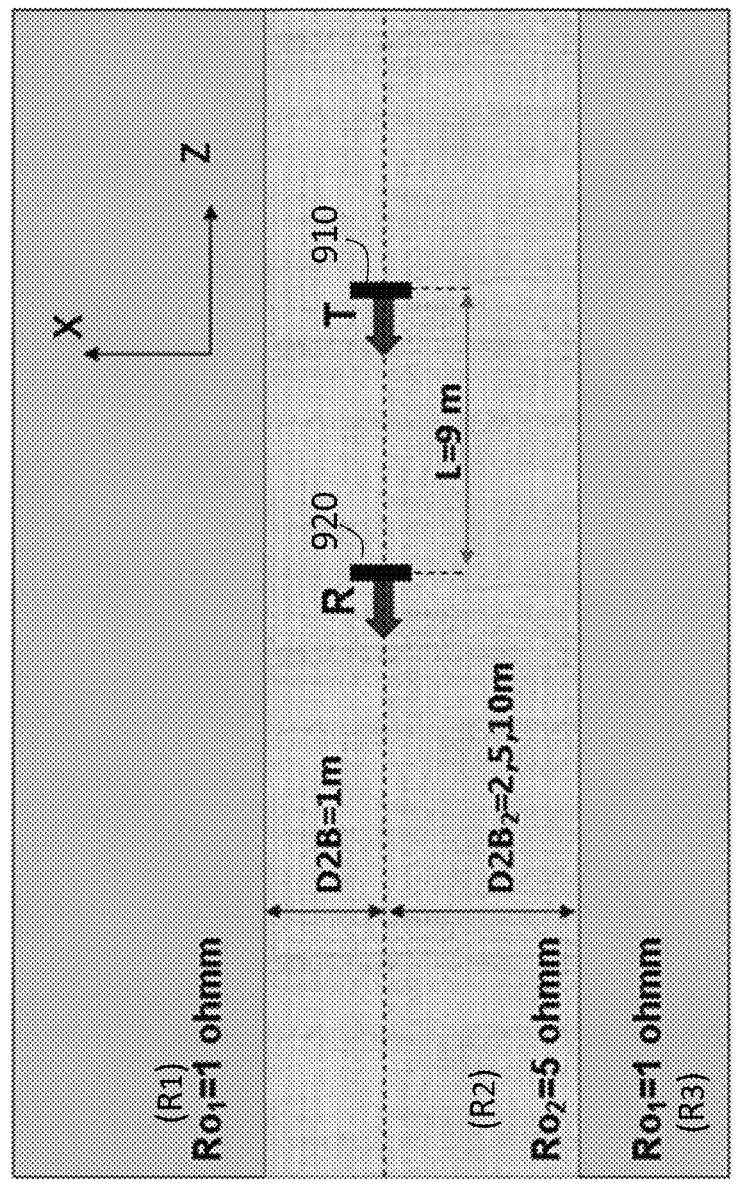
FIG. 9 illustrates an arrangement employing the inversion method according to embodiments of the invention.

FIG. 9 illustrates an arrangement employing the inversion method according to embodiments of the invention. A convolution-based approach (as discussed with reference to block 340) is used in the exemplary case of a parabolic pulse shape. As shown in FIG. 9, there are three formation layers. The model has five parameters: three resistivities associated with the three layers and two distances, $D2B_1$ and $D2B_2$, corresponding with the location of the induction tool 11 with respect to the upper and lower boundaries of the illustrated middle layer in FIG. 9. The transient processes, excited by a three-component x,y,z-transmitter 910, are measured by a three-component receiver 920 in the exemplary case. The parabolic pulse shape of the excitation current pulse is described as:

$$I(t) = -\frac{4}{T^2}t^2 + \frac{4}{T}t \qquad [EQ.\ 10]$$

where T=7 μs and the pulse duration is 5 μs (0≤t≤5 μs).

Initially, three five-parametric original lookup tables, corresponding to xx, yy, and zz components, and a step-function excitation pulse are generated. Then, using EQ. 2, three lookup tables of data $S_1(t)$ (modified lookup tables) are generated for the parabolic pulse shape given by EQ. 10. These lookup tables comprise the synthetic data used in the inversion of received data. The exemplary model used to generate three sets of the input data is a three-layered model, with each model using a different distance from the tool to the bottom boundary ($D2B_2$). The three models use $D2B_2$ values of 1, 5, and 10 meters. The $D2B_1$ value is 1 meter for all three models. Resistivity of the first ($R_1$) and third ($R_3$) layers ($Ro_1$) is 1 ohm, and resistivity of the second ($R_2$) layer ($Ro_2$) is 5 ohm. Measurements are assumed to start 2 μs after switching on the current in the transmitter 910 and to last 0.405 ms. No cross components (e.g., xy) are used, and random, normally distributed 20% noise (as a percentage of signal level) is added to the input data. Table 1 shows the five parameters in each column and, for each of the three models, includes the parameter value used to generate the input and the parameter value determined by the inversion.

TABLE 1

| $R_1$, OHM | $R_2$ OHMM | $R_3$ OHMM | $D2B_1$, M | $D2B_2$, M |
|---|---|---|---|---|
| MODEL$_1$: 1.0 | MODEL$_1$: 5.00 | MODEL$_1$: 1.00 | MODEL$_1$: 1.0 | MODEL$_1$: 2.0 |
| INVERSION: 1.00 | INVERSION: 5.46 | INVERSION: 1.62 | INVERSION: 0.7 | INVERSION: 1.89 |
| MODEL$_2$: 1.0 | MODEL$_2$: 5.00 | MODEL$_2$: 1.0 | MODEL$_2$: 1.00 | MODEL$_2$: 5.0 |
| INVERSION: 1.0 | INVERSION: 5.46 | INVERSION: 1.0 | INVERSION: 0.97 | INVERSION: 5.14 |
| MODEL$_3$: 1.0 | MODEL$_3$: 5.00 | MODEL$_3$: 1.00 | MODEL$_3$: 1.0 | MODEL$_3$: 10.0 |
| INVERSION: 1.0 | INVERSION: 4.28 | INVERSION: 5.46 | INVERSION: 0.97 | INVERSION: 0.5 |

As Table 1 indicates, for the first model (first row of Table 1), the worst determined parameter is the resistivity of the third ($R_3$) layer, which evidences an error of approximately 60%. The $D2B_2$ parameter, for example, only evidences an error of 5%. The second model (second row of Table 1) shows inversion results that all have less than 10% error associated with them. When $D2B_2$ was increased to 10 meters (model 3, third row of Table 1), the inversion failed to find the resistivity of the third ($R_3$) layer and $D2B_2$. These results indicate sensitivity of the data to the unresolved parameters. The result (for model 3, for example) may be improved by extending an observation time interval. An extended observation time interval (from the exemplary interval starting at 2 μs and extending 0.405 ms) may improve sensitivity of the data to the third layer (associated with $R_3$) and reduce the error in the inverted parameters.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method of estimating properties of a subsurface formation, the method comprising:
    obtaining a first lookup table by using a first excitation current pulse
    transmitting a second excitation current pulse into the formation, the second excitation current pulse being a different shape of excitation current pulse than the first excitation current pulse;
    receiving an induced pulse used to generate input data;
    modifying the first lookup table to generate a second lookup table specific to the second excitation current pulse;
    performing an inversion on the input data using the second lookup table to estimate the properties of the subsurface formation; and
    performing geo-steering in the subsurface formation based on the properties.

2. The method according to claim 1, further comprising generating the first lookup table based on a step-function excitation current pulse shape.

3. The method according to claim 2, wherein the modifying the first look-up table includes generating the second lookup table as a time-shifted version of the first lookup table for the second excitation current pulse being a linear excitation current pulse shape.

4. The method according to claim 2, further comprising generating a third lookup table by recalculating the first lookup table using a convolution integral for an excitation current pulse shape other than the step-function excitation current pulse shape and the second excitation current pulse shape.

5. A method of estimating properties of a subsurface formation using transient electromagnetic measurements, the method comprising:
    generating a first lookup table of synthetic data based on a step-function excitation current pulse shape;
    transmitting a second excitation current pulse into the subsurface formation, wherein the second excitation current pulse has a shape different than the step-function excitation current pulse shape;
    receiving transient electromagnetic (EM) data;
    generating a second lookup table of transient synthetic data using the first lookup table and the shape of the second excitation current pulse; and
    performing an inversion to estimate the properties of the subsurface formation using the transient EM data and the second lookup table.

* * * * *